United States Patent
Blinick et al.

(10) Patent No.: US 8,255,627 B2
(45) Date of Patent: Aug. 28, 2012

(54) SECONDARY CACHE FOR WRITE ACCUMULATION AND COALESCING

(75) Inventors: Stephen LaRoux Blinick, Tucson, AZ (US); Cheng-Chung Song, Tucson, AZ (US); Lokesh Mohan Gupta, Tucson, AZ (US); Yu-Cheng Hsu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 12/577,164

(22) Filed: Oct. 10, 2009

(65) Prior Publication Data
US 2011/0087837 A1  Apr. 14, 2011

(51) Int. Cl.
*G06F 12/00* (2006.01)

(52) U.S. Cl. ........ 711/118; 711/117; 711/119; 711/122; 711/135

(58) Field of Classification Search ................ 711/117, 711/118, 119, 122, 135
See application file for complete search history.

(56) References Cited

U.S. PATENT DOCUMENTS

| | | | |
|---|---|---|---|
| 5,542,066 A | | 7/1996 | Mattson et al. |
| 5,600,816 A | * | 2/1997 | Oldfield et al. ............... 711/113 |
| 6,467,022 B1 | | 10/2002 | Buckland et al. |
| 6,567,889 B1 | | 5/2003 | DeKoning et al. |
| 7,149,846 B2 | | 12/2006 | Hetrick |
| 7,975,109 B2 | * | 7/2011 | McWilliams et al. ........ 711/147 |
| 2002/0073110 A1 | * | 6/2002 | Duvillier et al. ............... 707/206 |
| 2002/0087815 A1 | * | 7/2002 | Arimilli et al. ............... 711/155 |
| 2004/0225659 A1 | | 11/2004 | O'Brien et al. |
| 2005/0188279 A1 | * | 8/2005 | Gibble et al. .................... 714/42 |
| 2006/0004957 A1 | | 1/2006 | Hand, III et al. |
| 2008/0010502 A1 | | 1/2008 | Baek et al. |
| 2008/0091875 A1 | * | 4/2008 | Mannenbach et al. ........ 711/113 |
| 2009/0106518 A1 | * | 4/2009 | Dow ............................. 711/165 |

(Continued)

FOREIGN PATENT DOCUMENTS

GB  2273798 A  6/1994

OTHER PUBLICATIONS

IBM Technical Disclosure Bulletin; Load Balancing of destage operation in a N way cache disk subsystem; Mar. 1, 2001; pp. 1-6; IBM corporation.*

(Continued)

*Primary Examiner* — Kevin Ellis
*Assistant Examiner* — Mehdi Namazi
(74) *Attorney, Agent, or Firm* — Nelson and Nelson; Daniel P. Nelson; Alexis V. Nelson (57) ABSTRACT

A method for efficiently using a large secondary cache is disclosed herein. In certain embodiments, such a method may include accumulating, in a secondary cache, a plurality of data tracks. These data tracks may include modified data and/or unmodified data. The method may determine if a subset of the plurality of data tracks makes up a full stride. In the event the subset makes up a full stride, the method may destage the subset from the secondary cache. By destaging full strides, the method reduces the number of disk operations that are required to destage data from the secondary cache. A corresponding computer program product and apparatus are also disclosed and claimed herein.

17 Claims, 10 Drawing Sheets

U.S. PATENT DOCUMENTS

| | | |
|---|---|---|
| 2009/0119353 A1 | 5/2009 | Oh et al. |
| 2009/0125671 A1 | 5/2009 | Flynn et al. |
| 2009/0216954 A1* | 8/2009 | Benhase et al. ............... 711/133 |
| 2010/0174864 A1* | 7/2010 | Bar-El et al. .................. 711/114 |

OTHER PUBLICATIONS

"Method and Apparatus for Combining Use of Magnetic Hard Drives and Solid State Disks for Optimal Performance and Lifespan", Author: IBM, Source: www.ip.com, Date: Feb. 2009, IP.com No. IPCOM000179606D.

"Providing Solid State Disk Capability in a Storage Controller", Author: IBM, Source: www.ip.com, Date: Sep. 2003, IP.com No. IPCOM000019207D.

"Multiple Solid State Memory Partitions Within Solid State Tape Cartridge With Data Transfer Cable", Author: IBM, Source: www.ip.com, Date: Mar. 2009, IP.com No. IPCOM000180818D.

* cited by examiner

SECONDARY CACHE FOR WRITE ACCUMULATION AND COALESCING

BACKGROUND

1. Field of the Invention

This invention relates to computer caches, and more particularly to apparatus and methods for using secondary caches for write accumulation and coalescing.

2. Background of the Invention

In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

Caches are often provided as multi-level caches. For example, a caching system may include both a "primary" and "secondary" cache. When reading data, a computing system or device may first look for data in the primary cache and, if the data is absent, look for the data in the secondary cache. If the data is not in either cache, the computing system or device may retrieve the data from disk drives or other storage devices. When writing data, a computing system or device may write data to the primary cache. This data may eventually be destaged to the secondary cache or a storage device to make room in the primary cache.

Flash memory and other solid-state memory devices can potentially create caches with much larger storage capacities than those currently utilized. Creating larger caches has the potential to fundamentally change the manner in which caches are used. Thus, as cache storage capacity increases, conventional caching algorithms may become obsolete or inadequate as they may fail to efficiently utilize the additional space or take advantage of performance improvements that may be possible with larger caches. Thus, apparatus and methods are needed to more efficiently use larger caches, such as large secondary caches.

In view of the foregoing, what are needed are apparatus and methods to efficiently utilize large caches such as large secondary caches. Further needed are apparatus and methods to take advantage of performance improvements that are possible with larger secondary caches.

SUMMARY

The invention has been developed in response to the present state of the art and, in particular, in response to the problems and needs in the art that have not yet been fully solved by currently available caching systems. Accordingly, the invention has been developed to provide apparatus and methods for efficiently using large secondary caches. The features and advantages of the invention will become more fully apparent from the following description and appended claims, or may be learned by practice of the invention as set forth hereinafter.

Consistent with the foregoing, a method for efficiently using a large secondary cache is disclosed herein. In certain embodiments, such a method may include accumulating, in a secondary cache, a plurality of data tracks. These data tracks may include modified data and/or unmodified data. The method may determine if a subset of the plurality of data tracks makes up a full stride. In the event the subset makes up a full stride, the method may destage the subset from the secondary cache. By destaging full strides, the method reduces the number of disk operations (hereinafter referred to as "disk ops") that are required to destage data from the secondary cache. A corresponding computer program product and apparatus are also disclosed and claimed herein.

In another aspect of the invention, a caching system in accordance with the invention includes a primary cache to store data tracks comprising modified data and/or unmodified data, a secondary cache, and at least one disk drive. A cache management module is provided to accumulate a plurality of data tracks comprising modified and/or unmodified data in the primary cache. A determination module determines if a subset of the plurality of data tracks makes up a full stride. In the event the subset makes up a full stride, a destage module destages the subset directly to the at least one disk drive. On the other hand, if the subset fails to make up a full stride, the destage module destages the subset to the secondary cache. A corresponding method is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may generally be referred to herein as a "module" or "system." Furthermore, the present invention may take the form of a computer program product embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

For the purposes of this disclosure, the phrase "secondary cache" is used to refer to any cache (including, for example, L2 or L3 cache) that resides between a primary cache and a storage device, such as a disk drive, tape drive, or the like.

Figure 1:
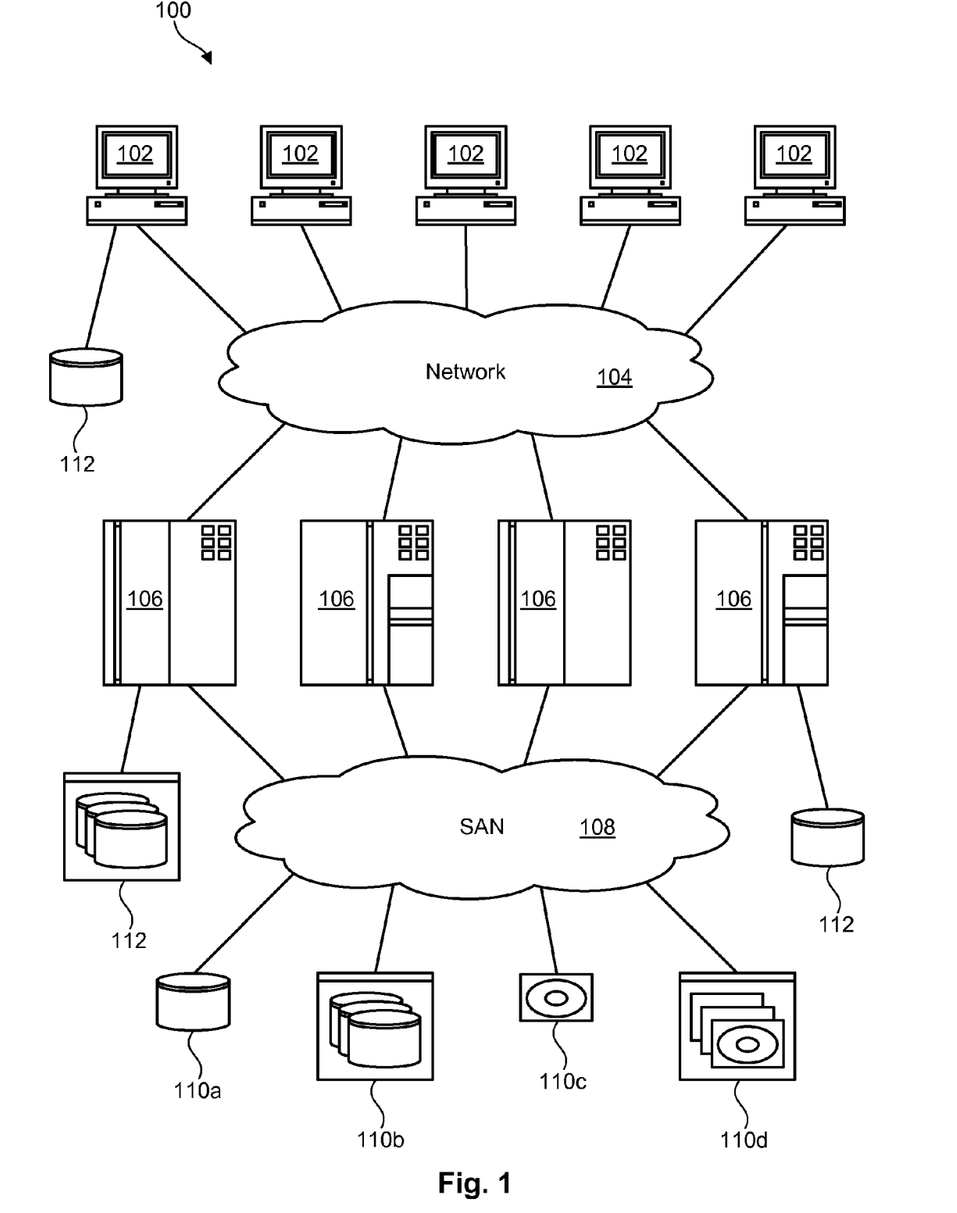
FIG. 1 is a high-level block diagram showing one example of a network and computing environment where an apparatus and method in accordance with the invention may be implemented.

Referring to FIG. 1, one embodiment of computer-network architecture 100 is illustrated. The architecture 100 is presented to show various scenarios for implementing the caching system illustrated herein. The architecture 100 is presented only by way of example and is not intended to be limiting. Indeed, the caching system disclosed herein may be applicable to a wide variety of different computers, servers, storage systems, and network architectures, in addition to the network architecture 100 shown.

As shown, the computer-network architecture 100 may include one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., hard disk drives, solid-state drives, tape drives, etc). These computers 102, 106 and direct-attached storage devices 112 may communicate using protocols such as ATA, SATA, SCSI, SAS, Fibre Channel, or the like. Any or all of the computers 102, 106 may utilize the caching system described herein to access data from the storage devices 112.

The computer-network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as individual hard disk drives 110*a* or solid state drives 110*a*, arrays 110*b* of hard disk drives or solid-state drives, tape drives 110*c*, tape libraries 110*d*, CD-ROM libraries, or the like. Where the network 108 is a SAN, the servers 106 and storage systems 110 may communicate using a networking standard such as Fibre Channel (FC). Any or all of the computers 102, 106 may utilize the caching system described herein to store data retrieved from the storage devices 110.

Figure 2:
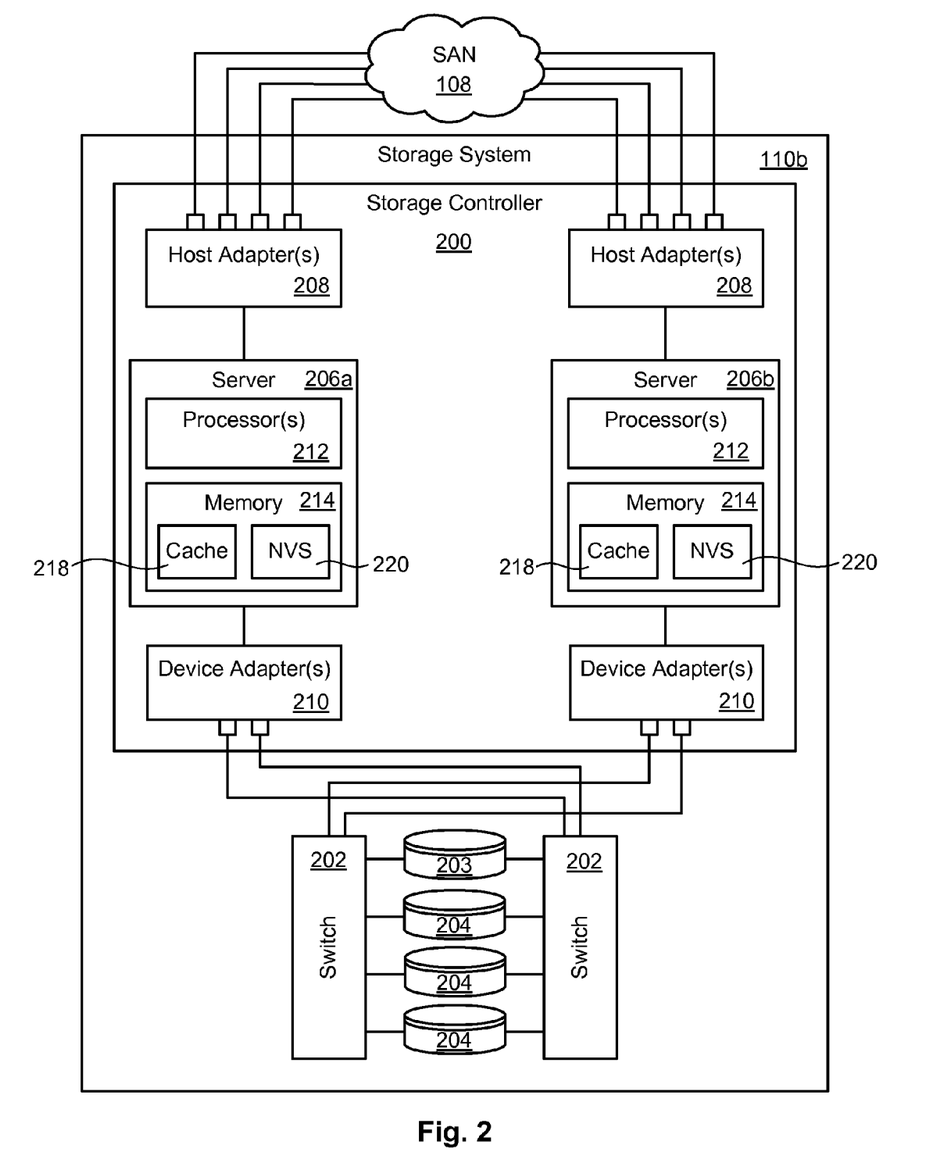
FIG. 2 is a high-level block diagram showing one example of a storage system where an apparatus and method in accordance with the invention may be implemented.

Referring to FIG. 2, one embodiment of a storage system 110*b* containing an array of hard-disk drives 204 and/or solid-state drives 203 is illustrated. The internal components of the storage system 110b are shown since the caching system may, in certain embodiments, be implemented within such a storage system 110b, although the caching system may also be applicable to other storage systems 110. As shown, the storage system 110b includes a storage controller 200, one or more switches 202, and one or more storage devices 203, 204, such as hard disk drives 204 or solid-state drives 203 (such as flash-memory-based drives 203). The storage controller 200 may enable one or more hosts 106 (e.g., open system and/or mainframe servers 106) to access data in the one or more storage devices 203, 204.

In selected embodiments, the storage controller 200 includes one or more servers 206. The storage controller 200 may also include host adapters 208 and device adapters 210 to connect the storage controller 200 to host devices 106 and storage devices 203, 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 203, 204. This process may be referred to as a "failover."

One example of a storage system 110b having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the caching system disclosed herein is not limited to the IBM DS8000™ enterprise storage system 110b, but may be implemented in any comparable or analogous storage system 110, regardless of the manufacturer, product name, or components or component names associated with the system 110. Furthermore, any system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may, in certain embodiments, store software modules that run on the processor(s) 212 and are used to access data in the storage devices 203, 204. The servers 206 may host at least one instance of these software modules. These software modules may manage all read and write requests to logical volumes in the storage devices 203, 204.

In selected embodiments, the memory 214 may include a cache 218. Whenever a host 106 (e.g., an open system or mainframe server 106) performs a read operation, the server 206 that performs the read may fetch data from the storages devices 203, 204 and save it in its cache 218 in the event it is required again. If the data is requested again by a host 106, the server 206 may fetch the data from the cache 218 instead of fetching it from the storage devices 203, 204, saving both time and resources. Similarly, when a host 106 performs a write, the server 106 that receives the write request may store the write in its cache 218, and destage the write to the storage devices 203, 204 at a later time. When a write is stored in cache 218, the write may also be stored in non-volatile storage (NVS) 220 of the opposite server 206 so that the write can be recovered by the opposite server 206 in the event the first server 206 fails.

Figure 3:
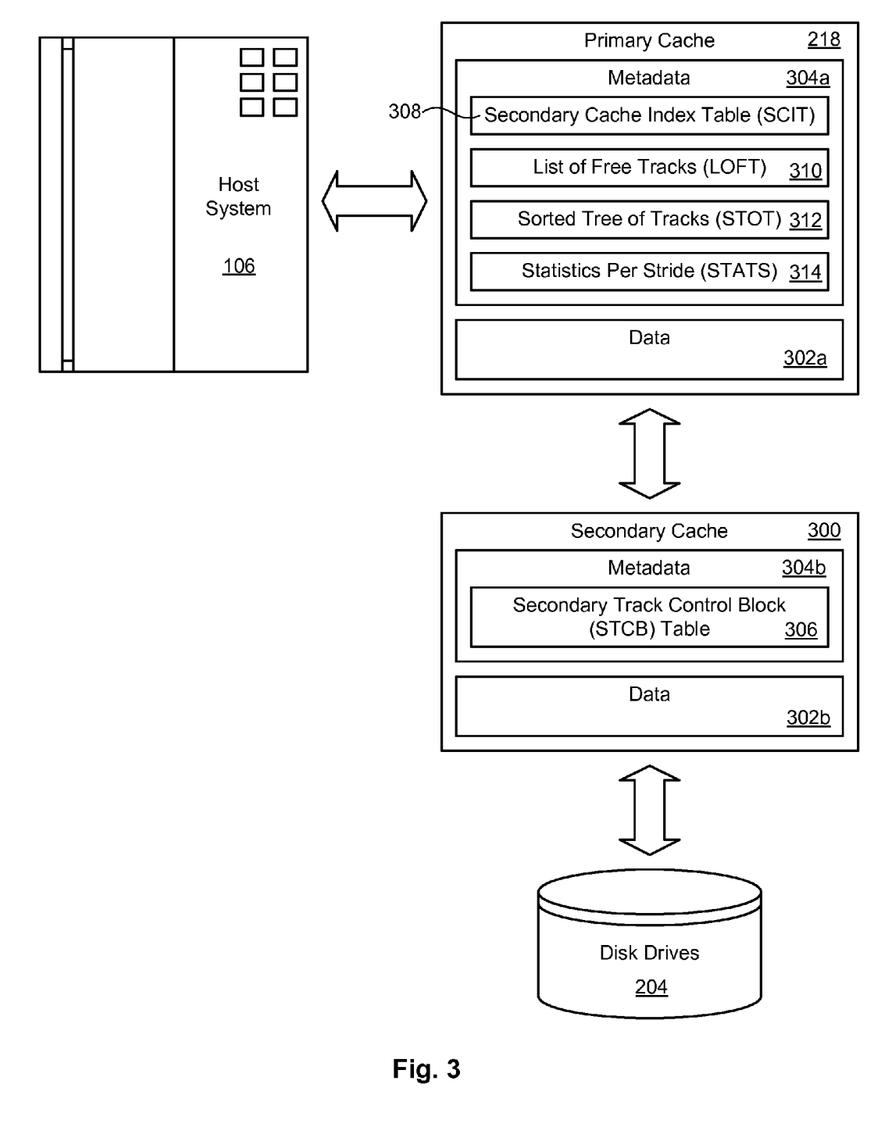
FIG. 3 is a high-level block diagram showing one embodiment of a multi-level cache in accordance with the invention.

Referring to FIG. 3, while continuing to refer generally to FIG. 2, as previously mentioned, a storage system 110b may include both hard disk drives 204 and solid-state drives (SSDs) 203, such as flash-memory-based drives 203. The I/O performance of SSDs 203 or other types of solid-state memory is typically far higher than the I/O performance of hard disk drives 204. Because of the higher I/O performance, the solid-state drives 203 may, in certain embodiments, be used to provide a large secondary cache 300 between the primary cache 218 and the hard disk drives 204. This large secondary cache 300 may significantly improve the I/O performance of the storage system 110b.

Using the secondary cache 300, if a read request is received by a server 106, the server 106 may initially look for data in the primary cache 218 and, if the data is not present, look for the data in the secondary cache 300 (residing in the solid-state drives 203). If the data is not available in either cache, the server 106 may retrieve the data from the disk drives 204. Similarly, when writing data, a server 106 may initially write the modified data to the primary cache 218. This modified data may eventually be destaged to the secondary cache 300 to make room in the primary cache 218. This data may then be destaged to the disk drives 204 to make space in the secondary cache 300, as needed.

In certain embodiments, the secondary cache 300 may be sized to provide about one to twenty percent, or in other embodiments about five percent of the total storage capacity of the storage system 110b. Thus, for a storage system 110b that contains about ten terabytes (TB) of storage (from both hard disk drives 204 and solid state drives 203), about 0.5 TB of this storage space may be used as a secondary cache 300. Such a large amount of secondary cache 300 may allow data to be destaged from the secondary cache 300 far less frequently than conventional secondary caches. As an example, a very large secondary cache 300 could store writes for an entire day without having to destage the writes to the disk drives 204. The writes could then be destaged at night or during a period of relative inactivity. Cache management algorithms may be redesigned to efficiently utilize the additional space in the secondary cache 300 and take advantage of the performance improvements that are possible using a large secondary cache 300.

As shown in FIG. 3, each cache 218, 300 may store data 302a, 302b and metadata 304a, 304b. As will be shown in FIG. 4, the data 302a, 302b may be stored in the form of tracks. Each track in the secondary cache 300 may have a secondary track control block (STCB) associated therewith. Along with other information, the STCB for each track may include a pointer to the next track in the chain, information indicating whether the track is free or in-use, as well as information indicating which sectors in the track have been modified. In certain embodiments, the STCBs for all the tracks may be stored in an STCB table 306 stored in the secondary cache 300.

Similarly, the primary cache 218 may also store metadata 304a associated with the secondary cache 300. For example, the primary cache 218 may store a secondary cache index table (SCIT) 308 that provides a directory for tracks in the secondary cache 300. In certain embodiments, the SCIT 308 is essentially a hash table with a constant hash function. To locate a specific track in the SCIT 308, the hash function may convert a track identifier (e.g., a track number) to a hash value. This hash value may then be looked up in the SCIT 308 to find the STCB for the track. Alternatively, the SCIT 308 could be incorporated into a cache directory of the primary cache 218, thereby providing a single hash table that stores tracks for both the primary and secondary caches 218, 300. In selected embodiments, the SCIT 308 is kept exclusively in the primary cache 218. The SCIT 308 may be built or rebuilt (in the event of a failover, failback, or initial microcode load (IML)) by reading the STCB table 306 in the secondary cache 300.

In certain embodiments, the primary cache 218 may also store a list of free tracks (LOFT) 310 that indicates which tracks in the secondary cache 300 are free (i.e., unoccupied). This list 310 may be used to locate free space in the secondary cache 300 in order to destage data from the primary cache 218 to the secondary cache 300. In selected embodiments, inserting or removing tracks from the LOFT 310 may be performed in a log structured manner. For example, tracks may be inserted at the end of the LOFT 310 and deleted from the front of the LOFT 310. The LOFT 310 may be kept exclusively in the primary cache 218 and may be built or rebuilt by reading the STCB table 306 in the secondary cache 300.

The primary cache 218 may also store a sorted tree of tracks (STOT) 312 that sorts the tracks by "trackid" or some other indicator. The STOT 312 may be used to minimize seek time (on the disk drives 204) when destaging tracks from the secondary cache 300 to the disk drives 204. The STOT 312 may be kept exclusively in the primary cache 218 and may be built or rebuilt by reading the STCB table 306 in the secondary cache 300.

The primary cache 218 may also store statistics per stride (STATS) 314 for each stride having one or more tracks in the secondary cache 300. A "stride" will be defined and discussed in more detail in association with FIGS. 4A and 4B. In general, the STATS 314 may be used to determine which tracks require the least number of disk operations ("disk ops") to destage from the secondary cache 300 to the disk drives 204. In general, the destage penalty for a track will be less where more tracks are present in a stride. When selecting tracks to destage, tracks requiring the least number of disk ops may be destaged first to minimize resource utilization. In selected embodiments, the STATS 314 may store information such as the number of tracks that are present in the secondary cache 300 for each stride, and the number of disk ops required to destage a track in a stride. In certain embodiments, the STATS 314 may store a "recency" bit for each stride. The recency bit may be incremented each time an eviction process passes through a stride. The recency bit may be reset each time a track is added to a stride. The recency bit may be used to keep strides in the secondary cache 300 that are actively being written to. The STATS 314 may be kept exclusively in the primary cache 218 and may be built or rebuilt by reading the STCB table 306 in the secondary cache 300.

The metadata 304a, 304b described above may be structured and stored in various different ways and is not limited to the illustrated structure or organization. The metadata 304a, 304b is provided by way of example to show one technique for storing and structuring the metadata 304a, 304b. For example, in certain embodiments, the data and metadata may be stored together in the secondary cache 300 in a circular log-structured array. Other methods for structuring and storing metadata 304a, 304b may be used and are encompassed within the scope of the invention.

Figure 4A:
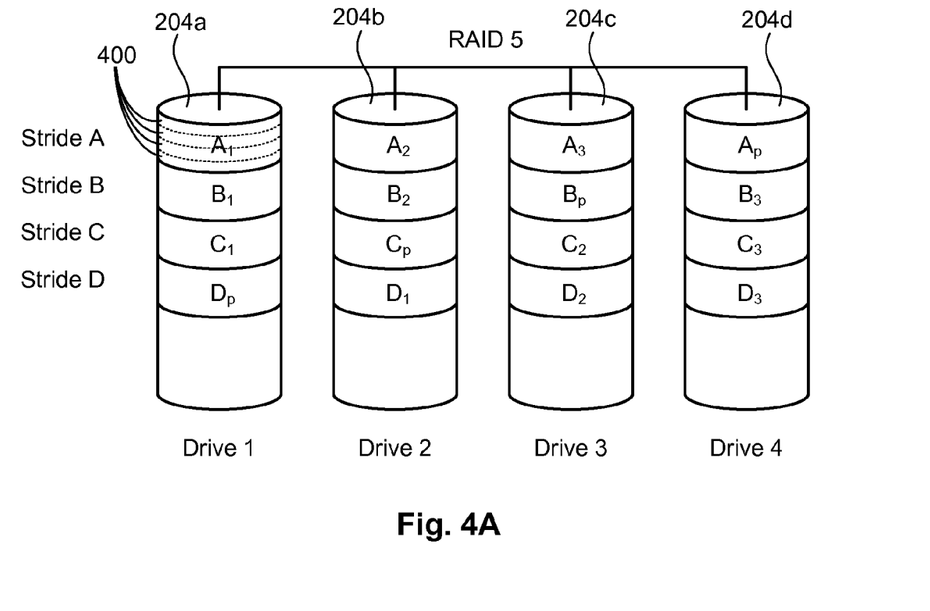
FIG. 4A is a high-level block diagram showing various strides stored in an array of disk drives.
Figure 4B:
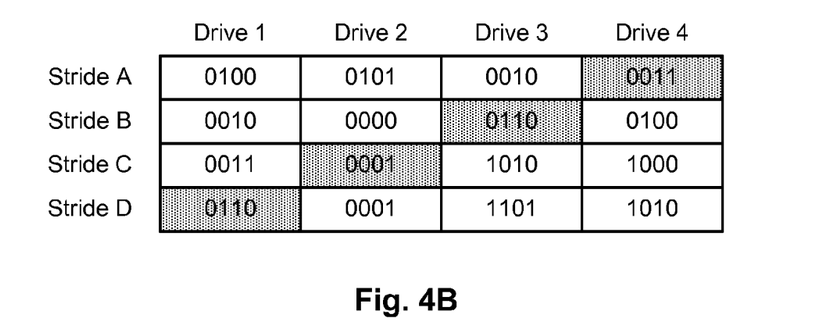
FIG. 4B is a table showing parity values calculated for each stride in the array of disk drives of FIG. 4A.

Referring to FIG. 4A, in selected embodiments, the disk drives 204 may be configured as a RAID (redundant array of inexpensive disks). For example, in a "RAID 5" configuration, logically sequential data may be segmented across multiple disk drives 204a-d. For example, where the disk drives 204a-d include four disks, logically sequential data "A" may be broken into segments "$A_1$", "$A_2$," and "$A_3$" (collectively referred to as "stride A") and stored on three separate disks 204a-c. In selected embodiments, each segment includes one or more tracks 400, although other divisions are also possible. Parity data "$A_p$" may be calculated by performing an XOR operation on $A_1, A_2$, and $A_3$. This parity data may be stored on a fourth disk 204d. Exemplary data and parity values are illustrated in FIG. 4B (the parity values are shaded). In the event one of the disks 204a-c fails, the remaining data and parity values may be used to reconstruct the data on the failed disk. For example, if the disk 204b containing $A_2$ is lost, the values $A_1, A_3$, and $A_p$ may be used to reconstruct $A_2$.

Disks configured in a RAID may offer accelerated read performance since data may be accessed from multiple drives 204a-c at the same time. However, there is typically increased overhead when performing writes to the array. This is primarily due to the parity calculation. For example, in order to write to $A_1$, the values $A_2, A_3$, and $A_p$ need to be loaded (i.e., staged) from the disk drives 204, the value $A_1$ needs to be modified on the disk drives, and the parity value $A_p$ needs to be recomputed and destaged to the disk drives 204. These operations require a total of four disk ops. On the other hand, a full stride of data (i.e., $A_1, A_2$, and $A_3$) may be destaged to the disk drives 204 along with the parity value $A_p$ using a single disk op. This is because there is no need to load the data values or parity value from the disk drives 204 when writing a stride thereto.

As previously mentioned, one advantage of a large secondary cache 300 is that data can be destaged from the secondary cache 300 far less frequently than conventional secondary caches. This may enable more data to accumulate in the secondary cache 300 before it is destaged to the disk drives 204. Accordingly, in selected embodiments, an apparatus and method in accordance with the invention may be configured to wait for full strides of data to accumulate and coalesce in the secondary cache 300 before the data is destaged to the disk drives 204. As explained above, this may minimize the number of disk ops required to destage data from the secondary cache 300 to the disk drives 204, thereby improving overall system performance.

Figure 5:
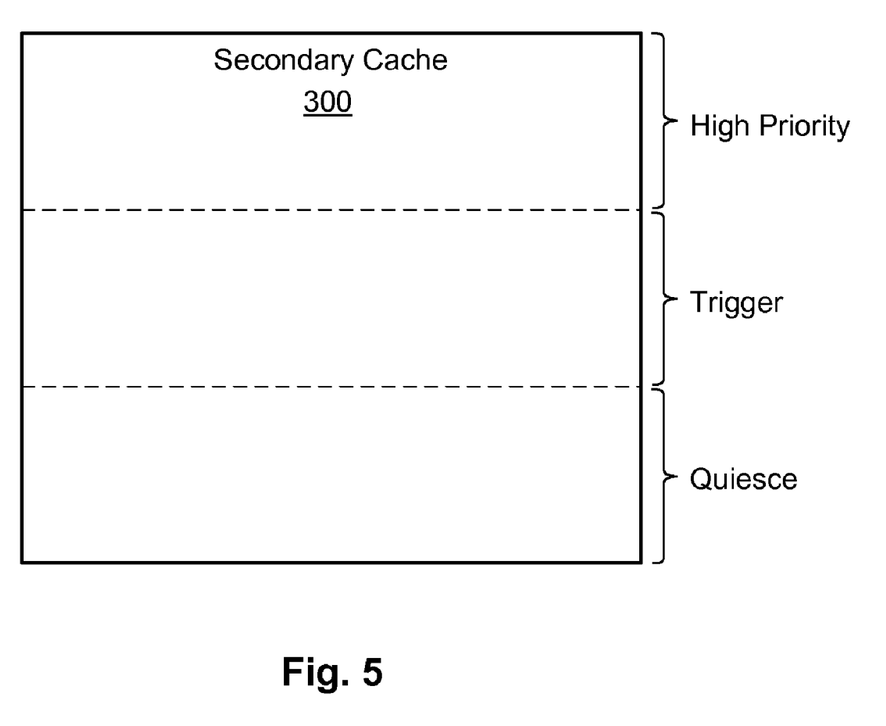
FIG. 5 is a high-level block diagram showing various levels or ranges that may be implemented within the secondary cache.

Referring to FIG. 5, in certain embodiments, evictions from the secondary cache 300 may be performed based on occupancy. For example, three ranges may be defined in the secondary cache 300: (1) quiesce; (2) trigger; and (3) high priority. When the occupancy of the secondary cache 300 is in the quiesce range (e.g., the secondary cache 300 is between zero and fifty percent full), no data may be evicted from the cache 300. Similarly, when the cache occupancy is in the trigger range (e.g., the secondary cache 300 is between fifty and seventy percent full), cache evictions may be performed in a normal mode until the cache occupancy is within the quiesce range. Similarly, when the cache occupancy is in a high priority range (e.g., the secondary cache 300 is greater than seventy percent full), cache evictions may be performed in a high priority mode until the cache occupancy is back in the trigger range. The numeric ranges provided above are presented only by way of example and are not intended to be limiting. Regardless of the eviction mode, the eviction process may destage tracks requiring the least number of disk ops to destage.

FIGS. 6 through 9 show various methods for managing data in the primary and secondary cache 218, 300, and more particularly for destaging and evicting data from the primary and secondary cache 218, 300 as well as reading data from the primary and secondary cache 218, 300. These methods may be executed as part of a broader cache management method or algorithm. These methods are provided by way of example and are not intended to be limiting.

Figure 6:
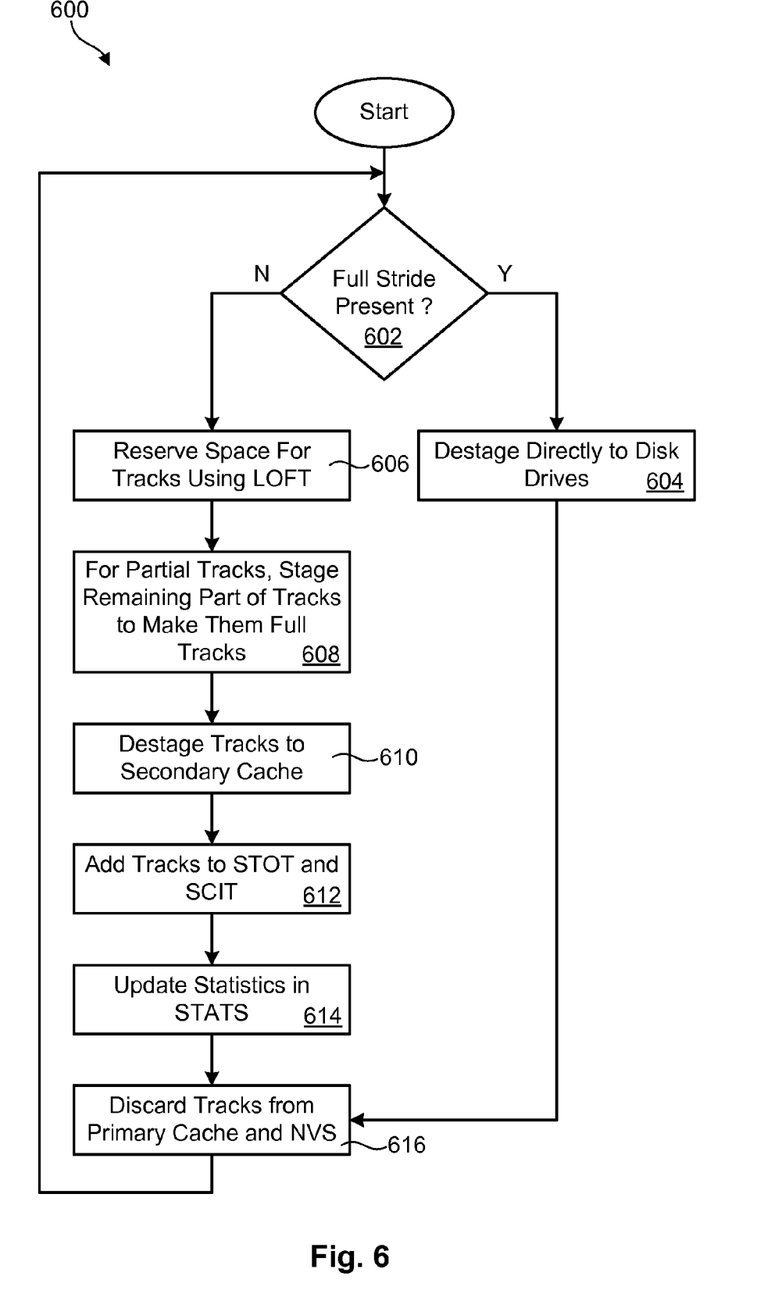
FIG. 6 is a flow diagram showing one embodiment of a method for destaging data from the primary cache.

Referring to FIG. 6, one embodiment of a method 600 for destaging data from the primary cache 218 is illustrated. Such a method 600 may include initially determining 602 whether a full stride is present in the primary cache 218. If a full stride is present, the method 600 may destage 604 the full stride directly to the disk drives 204 and discard 616 the tracks from the primary cache 218 and NVS 220. This step will bypass the secondary cache 300 since the penalty is very small to destage a full stride directly to the disk drives 204. On the other hand, if a full stride is not present in the primary cache 218, the method 600 may destage the tracks to the secondary cache 300. To accomplish this, the method 600 may reserve 606 space in the secondary cache 300 using the LOFT 310. For partial tracks, the method 600 may stage 608 the remainder of the tracks from the disk drives 204 to generate full tracks. The method 600 may then destage 610 the full tracks to the secondary cache 300. Once these tracks have been destaged, the method 600 may update the metadata 304a, 304b for the secondary cache 300, such as by adding 612 the destaged tracks to the STOT 312 and SCIT 308, and updating 614 the statistics in STATS 314. The method 600 may then discard 616 the tracks from the primary cache 218 and NVS 220.

Figure 7:
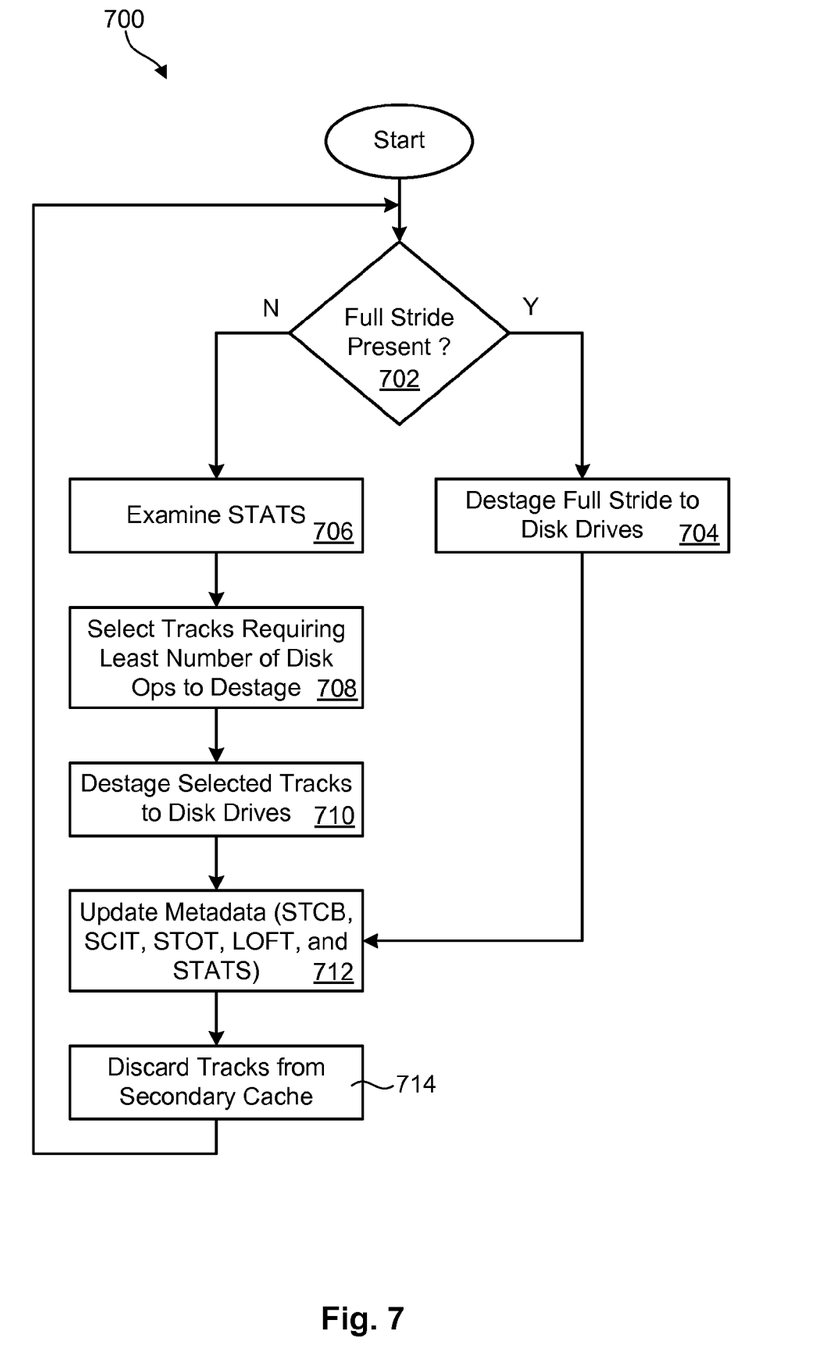
FIG. 7 is a flow diagram showing one embodiment of a method for destaging data from the secondary cache.

Referring to FIG. 7, one embodiment of a method 700 for destaging data from the secondary cache 300 to the disk drives 204 is illustrated. Such a method 700 may include initially determining 702 whether a full stride is present in the secondary cache 300. If a full stride is present, the method 700 may destage 704 the full stride to the disk drives 204. The method 700 may then update 712 the metadata 304a, 304b for the secondary cache 300 and discard 714 the tracks from the secondary cache 300.

If, at step 702, a full stride is not present in the secondary cache 300, the method 700 may examine 706 the STATS 314 to determine which tracks require the least number of disk ops to destage. The method 700 may then destage 710 tracks to the disk drives 204 starting with those that require the least number of disk ops. The method 700 may then update 712 the metadata 304a, 304b for the secondary cache 300 and discard 714 the tracks from the secondary cache 300.

Figure 8:
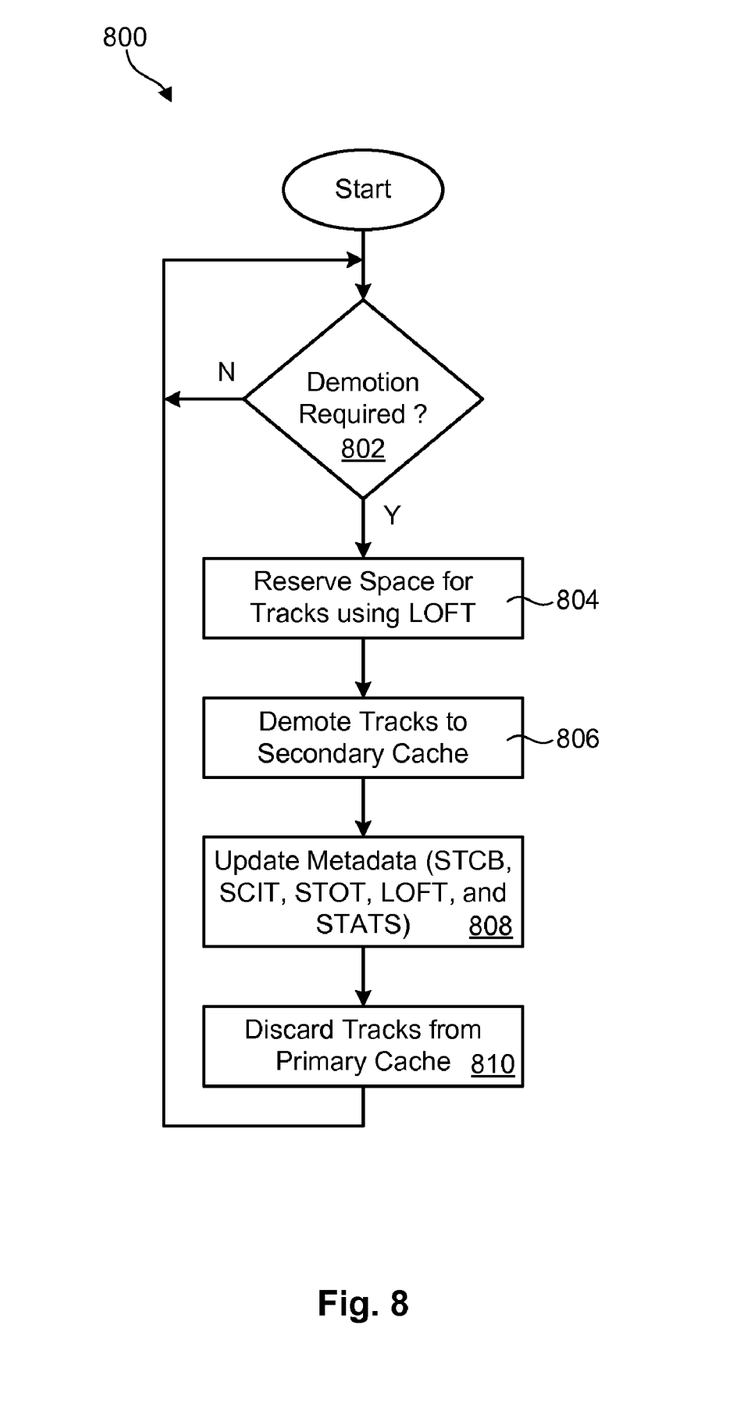
FIG. 8 is a flow diagram showing one embodiment of a method for demoting unmodified data from the primary cache to the secondary cache.

Referring to FIG. 8, one embodiment of a method 800 for demoting unmodified data from the primary cache 218 to the secondary cache 300 is illustrated. Demoting a track from the primary cache 218 is fast, but a subsequent read on that track is expensive since it will require reading the data from disk drives 204 or other slower media. On the other hand, demoting a track from the primary cache 218 to the secondary cache 300 may increase cache-hit ratio, but may incur a penalty by requiring resources to write data to the secondary cache 300 and update the associated metadata 304a, 304b. In selected embodiments, a flexible policy may be used to determine whether tracks should be demoted from the primary cache 218 to the secondary cache 300. This policy may depend on the penalty incurred by demoting the tracks, and more particularly how the demotion will affect the read-hit ratio.

For example, the flexible policy may consider whether the tracks are identified as hot spots by the customer or using certain statistics. If the tracks are hot spots, the tracks may be demoted to the secondary cache 300 instead of being discarded. The policy may also consider whether the tracks fill voids in modified tracks. If the tracks do fill voids, they may be demoted to the secondary cache 300 in order to create full strides therein (thereby reducing future write penalties). The policy may also consider whether the tracks contain certain types of metadata that may be inefficient to fetch. This metadata may be demoted to the secondary cache 300 (as opposed to being discarded) to ensure that it remains in cache. In other embodiments, the policy may consider the occupancy of the secondary cache 300 when considering whether to demote tracks thereto. For example, if the occupancy of the secondary cache 300 is low, random reads may be demoted from the primary cache 218 to the secondary cache 300 since plenty of free space is available. On the other hand, sequential data may not be demoted to secondary cache 300 since it is typically full strides that can be retrieved very quickly from the disk drives 204. The considerations listed above are only examples and are not intended to be limiting.

A method 800 may be used to demote tracks to the secondary cache 300 in the event a demotion is required. If a demotion is required 802, the method 800 may reserve 804 space in the secondary cache 300 using the LOFT 310. The method 800 may then demote 806 the tracks to the secondary cache 300. Once the tracks have been demoted 806, the method 800 may update 808 the metadata 304a, 304b for the secondary cache 300 and discard 810 the tracks from the primary cache 218.

Figure 9:
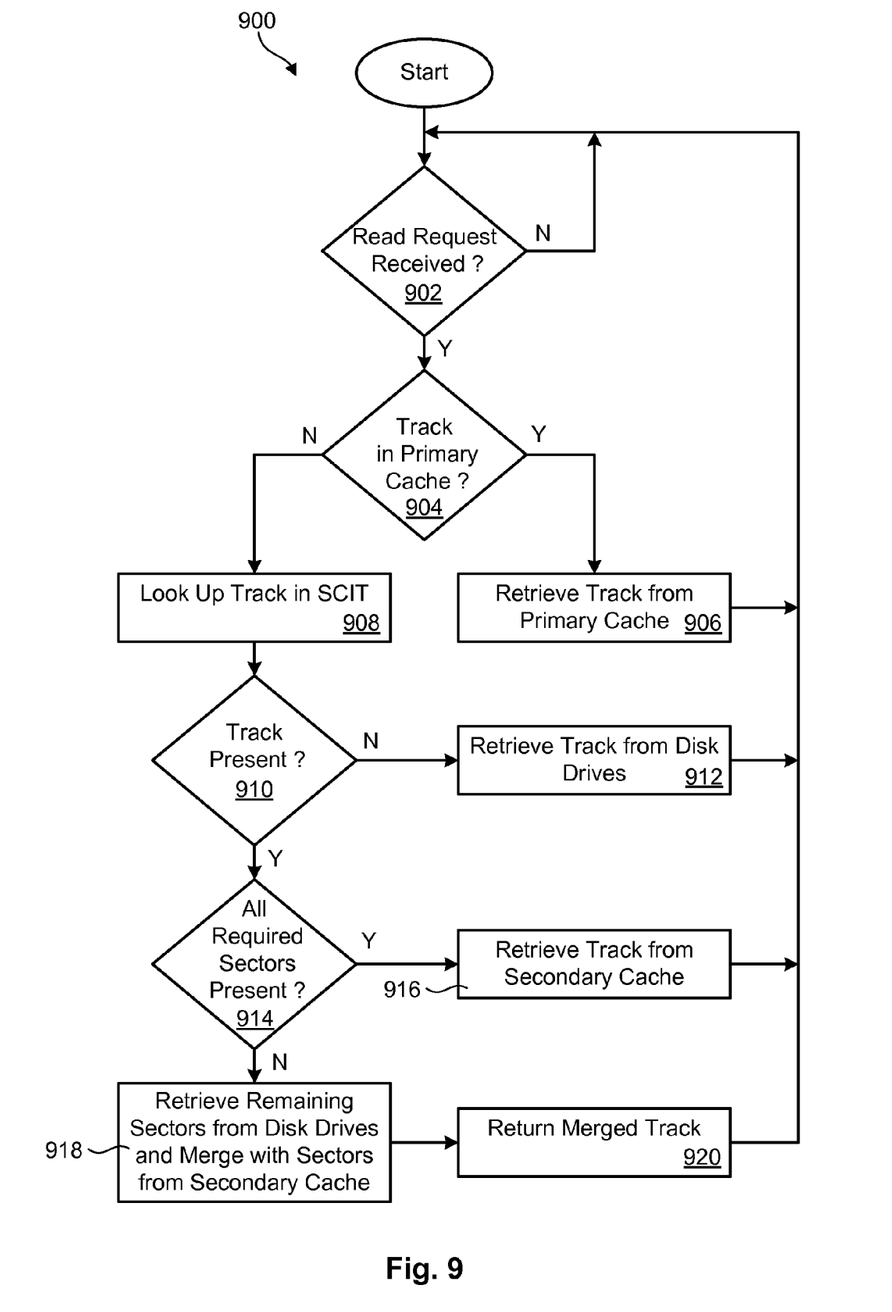
FIG. 9 is a flow diagram showing one embodiment of a method for processing read requests.

Referring to FIG. 9, one embodiment of a method 900 for processing read requests from a host system 106 is illustrated. In this embodiment, the method 900 may initially determine 902 whether a read request has been received. If a read request has been received, the method 900 may determine 904 whether the requested track is in the primary cache 218. If the requested track is in the primary cache 218, the method 900 may retrieve 906 the track from primary cache 218 and return it to the host system 106. If the track is not in the primary cache 218, the method 900 may look up 908 the track in the SCIT 308 to determine 910 whether the track is stored in the secondary cache 300.

If the track is not in the secondary cache 300, the method 900 may retrieve 912 the track from the disk drives 204 and return it to the host system 106. Conversely, if the track is in the secondary cache 300, the method 900 may then determine 914 whether all sectors of the track are present in the secondary cache 300. If all sectors are present, the method 900 may retrieve 916 the track from the secondary cache 300 and return it to the host system 106. If, on the other hand, all sectors are not present in the secondary cache 300, the method 900 may retrieve 918 the remaining sectors from the disk drives 204 and merge 918 the sectors with those in the secondary cache 300. The method 900 may then return 920 the merged track to the host system 106.

Figure 10:
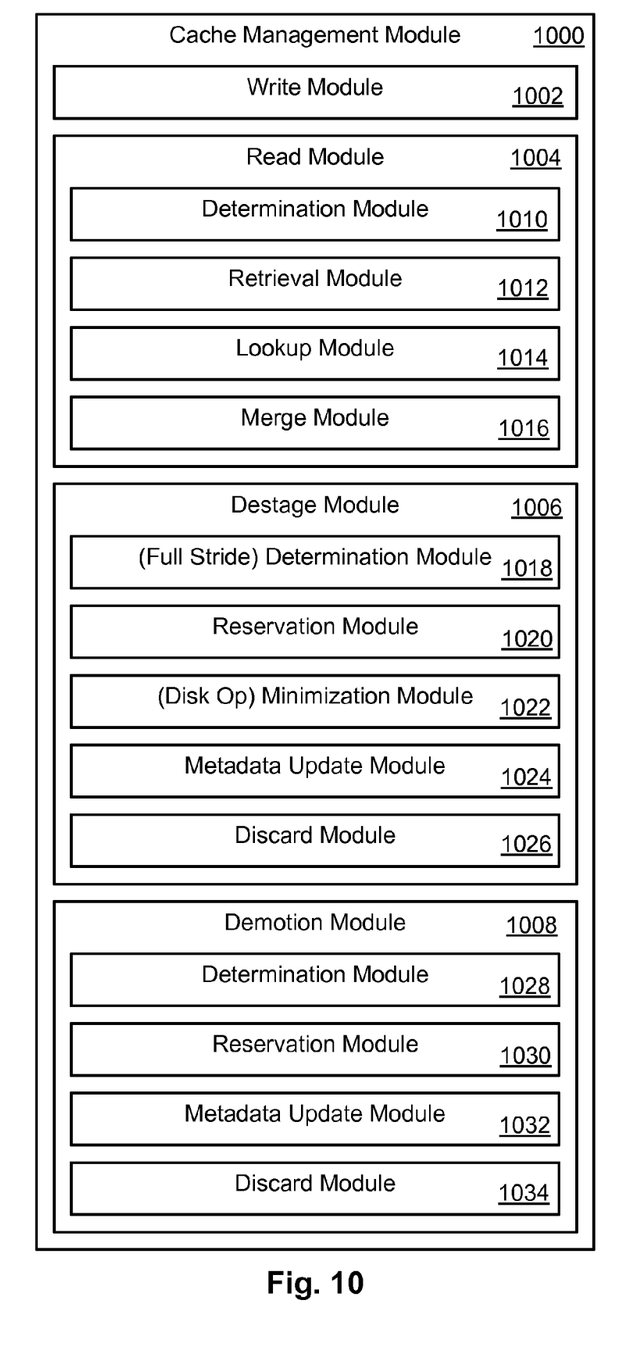
FIG. 10 is a high-level block diagram showing various modules that may be used to implement an apparatus and method in accordance with the invention.

Referring to FIG. 10, the methods described in FIGS. 6 through 9 may be implemented as one or more modules. These modules may be implemented in hardware, software or firmware executable on hardware, or a combination thereof. These modules may collectively be referred to as a cache management module 1000. In selected embodiments, the cache management module 1000 may include one or more of a write module 1002, a read module 1004, a destage module 1006, and a demotion module 1008, among other modules.

A write module 1002 may be configured to process write requests from the host system 106. In general, all writes from the host system 106 may be stored in the primary cache 218. The destage module 1006 may then destage these writes to the secondary cache 300 and disk drives 204 at a later time, as will be explained in more detail hereafter.

A read module 1004 may be configured to receive and process read requests from the host system 106. To accomplish this, the read module 1004 may include one or more of a determination module 1010, a retrieval module 1012, a lookup module 1014, and a merge module 1016. When a read request is received, the determination module 1010 may determine whether the requested track is in the primary cache 218. If the requested track is in primary cache 218, the retrieval module 1012 may retrieve the track from the primary cache 218 and return it to the host system 106. If the track is not in the primary cache 218, the determination module 1010 may then determine whether the track is in the secondary cache 300. To accomplish this, a lookup module 1014 may look up the track in the SCIT 308 or other suitable directory. If the track is in the secondary cache 300, the retrieval module 1012 may retrieve the track from the secondary cache 300 and return it to the host system 106. If the track is not in the secondary cache 300, the retrieval module 1012 may retrieve the track from the disk drives 204 and return it to the host system 106.

In the event only certain sectors of a track are present in the secondary cache 300, the retrieval module 1012 may retrieve the remaining sectors from the disk drives 204. A merge module 1016 may then merge these sectors with those already present in the secondary cache 300. The retrieval module 1012 may then return the merged track to the host system 106.

A destage module 1006 may be configured to destage modified tracks from the primary and secondary caches 218, 300 based on various algorithms. To accomplish this, the destage module 1006 may include one more of a determination module 1018, a reservation module 1020, a minimization module 1022, a metadata update module 1024, and a discard module 1026, among other modules.

If modified data needs to be destaged from the primary cache 218, the determination module 1018 may determine whether a full stride is present in the primary cache 218. If a full stride is present, the destage module 1006 may destage the full stride directly to the disk drives 204. If, on the other hand, a full stride is not present in the primary cache 218, the reservation module 1020 may reserve space in the secondary cache 300 (using the LOFT 310, for example). The destage module 1006 may then destage the tracks to the secondary cache 300. Once these tracks have been destaged, the metadata update module 1024 may update the metadata 304a, 304b for the secondary cache 300, such as by adding the destaged tracks to the STOT 312 and SCIT 308 and updating the statistics in STATS 314. Once the data tracks have been destaged from the primary cache 218 to either the disk drives 204 or the secondary cache 300, a discard module 1026 may discard the tracks from the primary cache 218 and NVS 220.

If, on the other hand, modified data needs to be destaged from the secondary cache 300 to the disk drives 204, the determination module 1018 may determine whether a full stride is present in the secondary cache 300. If a full stride is present, the destage module 1006 may destage the full stride to the disk drives 204. If, on the other hand, a full stride is not present in the secondary cache 300, a minimization module 1022 may examine the STATS 314 to determine which tracks require the least number of disk ops to destage. The destage module 1006 may then destage tracks that require the least number of disk ops. The metadata update module 1024 may then update the metadata 304a, 304b for the secondary cache 300. The discard module 1026 may then discard the tracks from the secondary cache 300.

A demotion module 1008 may be provided to demote unmodified data from the primary cache 218 to the secondary cache 300. To accomplish this, the demotion module 1008 may include one or more of a determination module 1028, a reservation module 1030, a metadata update module 1032, and a discard module 1034, among other modules. The determination module 1028 may determine whether a demotion from the primary cache 218 to the secondary cache 300 is required. If required, the reservation module 1030 may reserve space in the secondary cache 300 using, for example, the LOFT 310. The demotion module 1008 may then demote the tracks to the secondary cache 300. Once the tracks have been demoted, the metadata update module 1032 may update the metadata 304a, 304b for the secondary cache 300 and a discard module 1034 may discard the tracks from the primary cache 218.

The caching system described herein may be used in a wide variety of different computers, servers, storage systems, and network architectures. Thus, the caching system is not limited to the illustrated computers, servers, network architectures, or storage systems. Furthermore, it should be recognized that the secondary cache 300 is not limited to implementation in solid state drives 203, as discussed herein, but may be implemented in any solid-state memory or solid-state storage device having suitable storage space and I/O speed. The illustrated embodiments are only provided by way of example and are not intended to be limiting.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to efficiently use a large secondary cache, the method comprising:
   accumulating, in a secondary cache, a plurality of data tracks, the data tracks comprising at least one of modified data and unmodified data;
   determining if a subset of the plurality of data tracks makes up a full stride;
   retaining the subset of data tracks in the secondary cache if the subset of data tracks do not make up a full stride; and
   destaging the subset of data tracks from the secondary cache if the subset of data tracks do make up a full stride.

2. The method of claim 1, further comprising storing metadata and the plurality of data tracks together in the secondary cache in a circular log-structured array.

3. The method of claim 2, further comprising calculating a parity value associated with the subset and writing the parity value to at least one disk drive along with the subset.

4. The method of claim 2, further comprising destaging the data tracks to at least one disk drive starting with data tracks that require a least number of disk ops to destage.

5. The method of claim 4, further comprising reading from metadata associated with the secondary cache to determine which data tracks require the least number of disk ops to destage.

6. The method of claim 1, wherein the secondary cache is implemented in flash memory.

7. The method of claim 1, further comprising updating metadata associated with the secondary cache upon destaging the subset.

8. An apparatus to efficiently destage data from a large secondary cache, the apparatus comprising:
- a cache management module to accumulate, in a secondary cache, a plurality of data tracks, the data tracks comprising at least one of modified data and unmodified data;
- a determination module to determine if a subset of the plurality of data tracks makes up a full stride;
- a destage module to destage the subset of data tracks from the secondary cache if the subset of data tracks do make up a full stride; and
- the destage module further configured to retain the subset of data tracks in the secondary cache if the subset of data tracks do not make up a full stride.

9. The apparatus of claim 8, further comprising a metadata update module to store metadata and the plurality of data tracks together in the secondary cache in a circular log-structured array.

10. The apparatus of claim 9, further comprising a minimization module to determine which data tracks require a least number of disk ops to destage.

11. The apparatus of claim 10, wherein the minimization module is configured to read from metadata associated with the secondary cache to determine which data tracks require the least number of disk ops to destage.

12. The apparatus of claim 8, wherein the secondary cache is implemented in flash memory.

13. The apparatus of claim 8, further comprising a metadata update module to update metadata associated with the secondary cache upon destaging the subset.

14. A caching system comprising:
- a primary cache to store data tracks comprising at least one of modified data and unmodified data;
- a secondary cache behind the primary cache;
- at least one disk drive behind the secondary cache;
- a cache management module to accumulate, in the primary cache, a plurality of data tracks, the data tracks comprising at least one of modified data and unmodified data;
- a determination module to determine if a subset of the plurality of data tracks makes up a full stride; and
- a destage module to destage the subset directly to the at least one disk drive in the event the subset makes up a full stride; and
- the destage module further configured to destage the subset to the secondary cache in the event the subset fails to make up a full stride.

15. The caching system of claim 14, wherein the secondary cache is implemented in flash memory.

16. The caching system of claim 14, further comprising a metadata update module to update metadata associated with the secondary cache upon destaging the subset to the secondary cache.

17. A method comprising:
- accumulating, in a primary cache, a plurality of data tracks, the data tracks comprising at least one of modified data and unmodified data;
- determining if a subset of the plurality of data tracks makes up a full stride; and
- destaging the subset directly to at least one disk drive in the event the subset makes up a full stride; and
- destaging the subset to a secondary cache in the event the subset fails to make up a full stride.

* * * * *